United States Patent [19]
Perrigo

[11] Patent Number: 6,061,974
[45] Date of Patent: May 16, 2000

[54] RODENT BARRIER

[76] Inventor: Dennis Paul Perrigo, 2516 El Paso Ave., Redfield, Iowa 50233

[21] Appl. No.: 09/190,164

[22] Filed: Nov. 12, 1998

[51] Int. Cl.$^7$ ........................................................ A01K 3/00
[52] U.S. Cl. ............................... 52/101; 52/102; 52/170; 47/66.1; 47/66.3; 47/65.5; 47/73; 47/75; 47/85
[58] Field of Search .................. 52/101, 102, 170; 47/66.1, 66.3, 65.5, 73, 75, 85

[56] References Cited

U.S. PATENT DOCUMENTS

| | | | |
|---|---|---|---|
| 405,658 | 6/1889 | Campany | 52/170 |
| 5,205,090 | 4/1993 | Lavery | 52/102 |
| 5,427,339 | 6/1995 | Pauli et al. | 248/75 |
| 5,873,275 | 2/1999 | Lukich | 70/226 |

*Primary Examiner*—Christopher T. Kent
*Assistant Examiner*—Nkeisha J. Maddox
*Attorney, Agent, or Firm*—Patent & Trademark Services; Thomas Zack; Joseph H. McGlynn

[57] ABSTRACT

A rodent barrier device for use on the ground engaging tires of a vehicle. A continuous wall barrier made of a weather resistant and low outer friction slippery material, such as the slippery plastic LEXAN material, having an upper concave surface rim encircles the tires of the vehicle to be protected from the rodents. Initially before made into a continuous wall, the material making up the wall barrier may be a single elongated flat strip that is processed and bent into a continuous tire encircling wall by having the two opposite ends of the strip meet at a common edge.

6 Claims, 1 Drawing Sheet

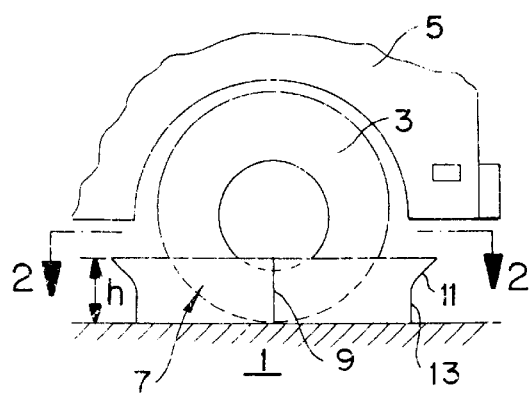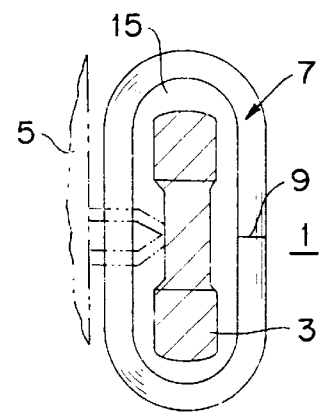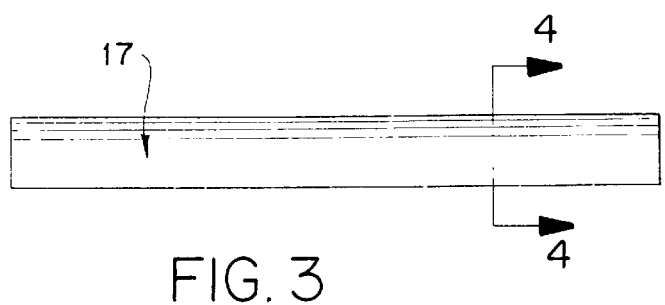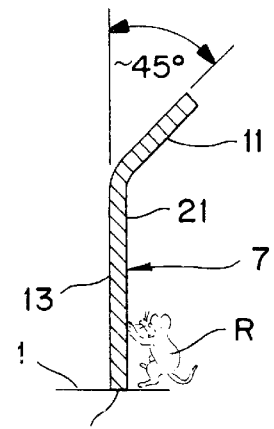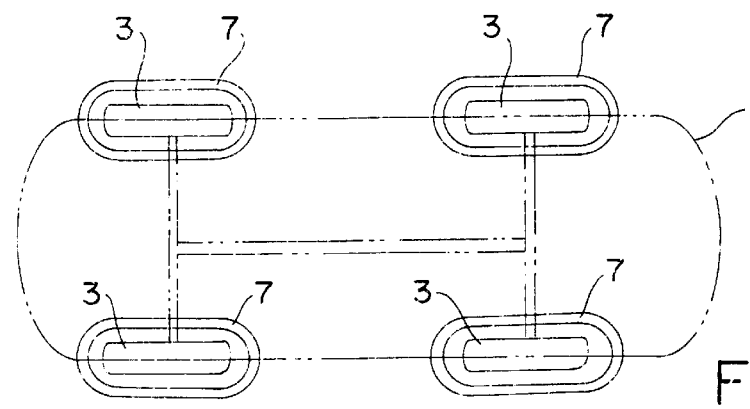

RODENT BARRIER

BACKGROUND OF THE INVENTION

From time immemorial people have been inventing and devising devices, chemicals and other apparatuses to either trap, kill or prevent the entry into places of rodents. Such innovations have been directed to protecting places like homes, factories, work places and other inhabitable dwellings. One expensive commonly owed object, namely vehicles, has received little notice in this rodent protection and eradication process.

Rodents, like mice, that can get into the engine, passenger compartment and other components of a vehicle may bite into rubber hoses or wires, cut interior fabrics and generally cause damage to any vehicle parts they are capable of damaging. Since the tires of a vehicle are the only parts normally in direct contact with the floor or ground, the rodents enter the vehicle by climbing up the tires. To prevent this entry of rodents upon and into the vehicle, the present invention has devised an inexpensive, chemical and toxic free, and easy to make and use device that can act as a rodent protective barrier all as detailed hereafter.

DESCRIPTION OF THE PRIOR ART

Rodent related devices that eliminate, trap or prevent the passage of rodents to a specific location are known. For example, in U.S. Pat. No. 3,528,191 to Hand a rodent elimination device is disclosed having a rotating cylinder with a food paste over a pail of water. When the rodent attempt to get the food paste it apparently falls into the water and drowns.

In the Ling reference (U.S. Pat. No. 5,090,152) a rodent barrier for pipes is described that includes a wire cone made of springs in the pipe which tapers in the direction of sewage flow.

The Little et al. patent (U.S. Pat. No. 5,406,741) discloses a rodent trap using an inclined screen with bait about mid-height of the screen. As the rodent attempts to get the bait it falls into a containers filled with an oil and antifreeze mixture.

In the Arnold, Sr. invention (U.S. Pat. No. 5,581,934) a rodent screen is inserted in the end of a corrugated plastic drainage pipe to prevent rodent incursions into the pipe.

The present invention relates to rodent barrier device used to prevent the passage of rodents into a vehicle all as more fully set forth in this specification.

SUMMARY OF THE INVENTION

This invention relates to rodent barrier device for a vehicle. A continuous wall barrier made of a rigid moisture resistant slippery material, such as a hard smooth surface plastic, having an upper concave surface rim encircles the tires of the vehicle to be protected from the rodents. Initially the material making up the wall barrier may be a single elongated flat strip that is processed and bent into a continuous tire encircling wall where both opposite ends of the strip meet at a common juncture.

It is the primary object of the present invention to provide for an improved rodent barrier device for use with a vehicle.

Another object is to provide for such a device wherein there is a continuous strip of a ground engaging material that encircles the tires of a vehicle.

These and other objects and advantages of the present invention will become apparent to readers from a consideration of the ensuing description and the accompanying drawings.

BRIEF DESCRIPTION OF THE DRAWINGS

FIG. 1 is a side view of the invention's preferred embodiment place on the ground and encircling a tire of a vehicle.

FIG. 2 is a top view taken along line 2—2 of FIG. 1 as viewed downward toward the ground.

FIG. 3 shows a typical elongated flat strip used to make the rodent barrier wall before it has been processed and bent.

FIG. 4 shows an enlarged cross-sectional view of the FIG. 3 strip taken along line 4—4 of FIG. 3.

FIG. 5 schematically shows the a top view of one barrier arrangement for a vehicle having four ground engaging tires.

DESCRIPTION OF THE PREFERRED EMBODIMENT

FIG. 1 is a side view of the invention's preferred embodiment place on the ground 1 and encircling each tire 3 of the vehicle 5 whose front part is shown. The term "ground" as herein includes any generally flat supporting surface on which a vehicle's tire can rest for support, such as the earth, a driveway, the pavement of a street, a garage floor, a parking lot floor, etc.

Resting on the ground 1 is the continuous vertically disposed rodent barrier wall 7 that encircles the tire 3 up to a given height h. In this embodiment the encircling wall 7 has two abutting end wall edges that touch each other or are slightly separated from each other at the juncture 9. Along the upper portion of the wall 7 a concave or cove edge 11 exists and extends outwardly from the generally vertical wall and runs completely around the upper part of the wall to provide an increasing steep inclined surface a measured vertical. Normally, the wall's upper cove edge 11 makes an angle of about 45 degrees or more when measured from the main lower section 13 of the vertically disposed wall 7. Of course, the wall itself could be one continuous curved surface (when viewed in cross-section) with an increased angular curvature need the top portion. The cove upper portion combined with the wall's slippery outer surface prevents a rodent who has climbed the lower wall section 13, from getting completely over the top of the wall defined by the height h.

The material making up the wall 7 should be rigid enough to be self supporting when in a continuous wall configuration; resistant to elements normally found around the ground and vehicles such as oil, grease, antifreeze and moisture; and have a slippery exterior surface or a surface on which such a coating may be applied thereto. The plastic material LEXAN is one example of a material that has all of these desired characteristics.

FIG. 2 is a top view taken along line 2—2 of FIG. 1 as viewed downward toward the ground. In this view the continuous wall 7 has its lower edge engaging the supporting lower ground 1 and the wall completely encircles the tire and ground where the tire rests. A small space 15 may exist around and between the continuous elliptically shaped wall 7 and the tire it surrounds in this view. The juncture 9 at the joining or abutting ends of the wall could be eliminated by making the wall of one continuous material in the manufacturing process.

FIG. 3 shows a typical elongated flat plastic strip 17 used to make the rodent barrier wall 7 before it has been processed and bent into a continuous configuration. One method that could be used to make the plastic wall 7 from the plastic strip 17 is the plastic injection molding process. Injection molding is a plastic molding process whereby heat softened plastic material is forced under very high pressure into a metal cavity mold, usually aluminum or steel, which is relatively cool. The inside cavity of the mold is comprised of two or more halves, and is the same desired shape as the product to be formed (in this case the continuous elliptically shaped wall 7 with its upper concave lip or cove surface 11).

High pressure hydraulics are used to keep the mold components together during the actual injection phase of the molding process. The injected plastic is allowed to cool and harden in the mold. The hydraulics holding the multiple component mold cavity together are released, the mold halves are separated and the solid formed plastic item is removed. Injection molding can be highly automated process and is capable of producing extremely detailed parts at a very cost effective price. The process should be invaluable in producing this invention's rodent barrier wall cost effectively.

FIG. 4 shows an enlarged cross-sectional view of the FIG. 3 strip taken along line 4—4 of FIG. 3. Essentially, except of a slight bending, the cross section of the wall shown is the same as the wall 7 shown in the first two figures. The lower wall section 13 has a lower ground engaging edge 19 that extends completely around the bottom of wall 7 after it has been processed and bent into the shape shown in FIGS. 1 and 2. When so processed and bent, the upper portion of wall section 13 forms a continuous surface extension that engages the outwardly bent upper concave cove 11 wall section. The outer wall surface 21 extends from the lowest wall edge 19 to the top of the cove wall section 11 is made of a slippery material or may have a slippery material coating applied to it such that a rodent R, like the mouse shown, is prevented from climbing up and over the continuous wall on to the tire and then into or on the vehicle. The cove's section makes a greater angle than the lower portion of the wall as measured from vertical. Normally, as measured from a vertical line V, the angular disposition of the upper cove surface area 11, as seen in cross section (FIG. 4), increases from the lower generally vertical wall section 13 such that is about 45 degrees outwardly from vertical.

As stated before, the continuous wall 7 could be one ever increasing solid curved cross sectional wall and constructed in one continuous ring joined that is generally elliptical when view from above. Other continuous wall configurations may also be used as long as they have the necessary low friction outer surface characteristics. Preferably the walls should have an upper steep concave lip to prevent the rodents from climbing over them. Normally, the coefficient of friction for the outer wall surface is very low and appreciably less than that of dry wood on dry wood (0.35). The exact minimum value for the coefficient of friction can be experimentally determined using mice or other rodents on the material or coating selected for the barrier wall's outer surface. Experience has shown LEXAN material inherently satisfies these necessary low coefficient of frictional surface requirements.

Generally one wall 7 should be used around each ground engaging tire that supports the vehicle. FIG. 5 schematically shows the a top view of such an arrangement for a vehicle having four ground engaging tires 3 with four barrier walls 7. Thus, in most cases four such walls would be necessary for the four ground engaging tires of most vehicles as in this last figure, although, the number of barrier walls could vary depending on the number of ground engaging vehicle tires (e.g, two for a motorcycle or more for a trailer truck rig).

Although the present invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. The combination of a rodent barrier device and a ground engaging tire of a vehicle comprising:

a ground engaging tire mounted on a vehicle, said tire having a ground engaging lower portion; and a vertically disposed continuous barrier wall having an outer low friction surface and a ground engaging lower edge, said lower edge surrounding the ground engaging portion of said tire, said barrier wall forming a space within the barrier wall and being adapted to rest upon the ground to surround the ground engaging portion of said tire within the formed space to protect the tire from a rodent climbing up the tire.

2. The combination of a rodent barrier device and a ground engaging tire as claimed in claim 1, wherein said barrier wall has an upper cove lip extending completely around the barrier wall, said cove lip making an angle with respect to the ground greater than the angle of the lower portion of the wall as measured in a vertical direction.

3. The combination of a rodent barrier device and a ground engaging tire as claimed in claim 2, wherein said continuous barrier wall forms an elliptical shaped continuous barrier wall around said tire when view from above.

4. The combination of a rodent barrier device and a ground engaging tire as claimed in claim 3, wherein said upper cove lip makes an angle of about 45 degrees as measured from a vertical direction.

5. The combination of a rodent barrier device and a ground engaging tire as claimed in claim 4, wherein said outer low friction surface of the continuous barrier wall has a coefficient of friction of less than 0.35.

6. The combination of a rodent barrier device and a ground engaging tire as claimed in claim 4, wherein said barrier wall is made of a plastic material.

* * * * *